(12) United States Patent
Ruggieri et al.

(10) Patent No.: US 11,962,206 B2
(45) Date of Patent: Apr. 16, 2024

(54) DEVICE AND METHOD FOR BENDING HAIRPIN WINDING HEADS

(71) Applicant: TECNOMATIC S.P.A., Corropoli (IT)

(72) Inventors: Giovanni Ruggieri, Corropoli (IT); Francesco Lucchetti, Corropoli (IT); Maurilio Micucci, Corropoli (IT); Giuseppe Ranalli, Corropoli (IT)

(73) Assignee: TECNOMATIC S.P.A. (IT)

( * ) Notice: Subject to any disclaimer, the term of this patent is extended or adjusted under 35 U.S.C. 154(b) by 694 days.

(21) Appl. No.: 17/254,052

(22) PCT Filed: Jun. 20, 2019

(86) PCT No.: PCT/IB2019/055197
§ 371 (c)(1),
(2) Date: Dec. 18, 2020

(87) PCT Pub. No.: WO2019/244090
PCT Pub. Date: Dec. 26, 2019

(65) Prior Publication Data
US 2021/0119519 A1    Apr. 22, 2021

(30) Foreign Application Priority Data
Jun. 20, 2018  (IT) .......................... 102018000006494

(51) Int. Cl.
*H02K 15/04*    (2006.01)
*B21D 7/024*    (2006.01)
(Continued)

(52) U.S. Cl.
CPC ......... *H02K 15/0421* (2013.01); *B21D 39/04* (2013.01); *B60K 6/26* (2013.01); *H02K 3/28* (2013.01)

(58) Field of Classification Search
CPC ............... H02K 15/04; H02K 15/0421; H02K 15/0414; H02K 15/0428; H02K 15/024;
(Continued)

(56) References Cited

U.S. PATENT DOCUMENTS 3,837,072 A      9/1974  Moberg
5,363,546 A  *  11/1994  Bradtmueller ......... H02K 13/04
                                                    29/736
(Continued)

FOREIGN PATENT DOCUMENTS

DE    102018108656 A1  *  10/2019
EP       0222140 A1  *   5/1987
GB       2099336 A       12/1982

OTHER PUBLICATIONS

International Search Report, issued in PCT/IB2019/055197, dated Oct. 30, 2019, Rijswijk, Netherlands.
(Continued)

*Primary Examiner* — Edgardo San Martin
(74) *Attorney, Agent, or Firm* — Valauskas Corder LLC

(57) ABSTRACT

A device for modeling hairpins promoting insertion of winding sets of the hairpins on a stator or rotor to allow an increased filling of the slot space in an assembly of winding sets on the stator or rotor is provided. Application relates to electric stators or rotors, and any device using electric wires having any gauge.

9 Claims, 10 Drawing Sheets

(51) Int. Cl.
   *B21D 39/04*    (2006.01)
   *B60K 6/26*    (2007.10)
   *H02K 3/28*    (2006.01)

(58) Field of Classification Search
   CPC . H02K 3/28; H02K 3/12; B21D 7/024; B21D 7/025; B21D 7/02; B21D 7/00
   See application file for complete search history.

(56) References Cited

U.S. PATENT DOCUMENTS

| | | | | |
|---|---|---|---|---|
| 6,833,648 | B2 * | 12/2004 | Gorohata | H02K 15/0037 |
| | | | | 310/201 |
| 6,836,046 | B2 * | 12/2004 | Gorohata | H02K 15/0428 |
| | | | | 310/201 |
| 6,862,796 | B2 * | 3/2005 | Kato | H02K 15/064 |
| | | | | 29/598 |
| 6,910,257 | B1 * | 6/2005 | Gorohata | H02K 15/0428 |
| | | | | 310/156.01 |
| 7,480,987 | B1 | 1/2009 | Guercioni | |
| 7,622,843 | B2 | 11/2009 | Cai | |
| 8,552,611 | B2 * | 10/2013 | Matsuoka | H02K 3/12 |
| | | | | 310/260 |
| 11,018,563 | B2 * | 5/2021 | Miyawaki | H02K 15/08 |
| 11,356,004 | B2 * | 6/2022 | Choi | H02K 3/12 |
| 11,394,280 | B2 * | 7/2022 | Radtke | H02K 15/0087 |
| 11,496,028 | B2 * | 11/2022 | Jang | B21F 1/004 |
| 2004/0041491 | A1 | 3/2004 | Gorohata et al. | |
| 2009/0178270 | A1 | 7/2009 | Guercioni | |
| 2009/0302705 | A1 | 12/2009 | Guercioni | |
| 2010/0064505 | A1 | 3/2010 | Takada et al. | |
| 2012/0319523 | A1 | 12/2012 | Manabu et al. | |
| 2014/0223727 | A1 * | 8/2014 | Watanabe | H01F 41/04 |
| | | | | 72/352 |
| 2017/0025932 | A1 * | 1/2017 | Radtke | H02K 15/0031 |
| 2019/0190359 | A1 * | 6/2019 | Miyawaki | H02K 3/04 |
| 2022/0271630 | A1 * | 8/2022 | Graef | H02K 15/02 |

OTHER PUBLICATIONS

International Preliminary Report on Patentability, completed Sep. 21, 2020, European Patent Office.

* cited by examiner

DEVICE AND METHOD FOR BENDING HAIRPIN WINDING HEADS

CROSS-REFERENCE TO RELATED APPLICATIONS

This application is a U.S. National Phase filing of PCT International Patent Application No. PCT/IB2019/055197, having an international filing date of Jun. 20, 2019, which claims priority to Italian Patent Application No. 102018000006494, filed Jun. 20, 2018 each of which is hereby incorporated by reference in its entirety.

FIELD OF THE INVENTION

The present description relates to the field of devices configured to model hairpins with which a stator or rotor winding set is formed.

BACKGROUND OF THE INVENTION

It is known and now widespread to manufacture stators or rotors of electric machines, such as generators or electric engines, for example for applications in hybrid electric vehicles (HEVs), in which the stator or rotor winding consists of a plurality of bent bar conductors variously interconnected to one another so as to form electrical windings, also referred to as "bar windings". Such bent bar conductors are also referred to as "hairpin conductors" or simply "hairpins". Bar windings may consist of one or more concentric winding sets, sometimes known as "crowns", each winding set already being a winding per se ("winding set").

In particular, windings with hairpins having a circular cross section (also referred to as "round wire conductors") or rectangular cross section, or even conductors having a cross section with variable geometry along their length (e.g. round conductors made rectangular in the part accommodated in the slot), belong to the known art. To this end, "rectangular" or "square" conductor in the present description means a wire having four substantially flat sides, each joined to the adjacent sides, typically by a rounded edge. Bar conductors having a trapezoid-shaped cross section are known.

The aforesaid bar conductors are preformed from rectilinear bar conductors usually by means of "U"- or "P"- shaped bending. American Patent U.S. Pat. No. 7,480,987 describes an example of a method of preforming rectilinear bar conductors to form hairpins. "U"- or "P"-shaped preformed conductors, often also referred to as "preformed basic conductors" in the industry, typically have two legs placed side-by-side, having equal or different length, each having a free end portion and an opposite end portion which is connected to the other of the two legs by means of a bridge-like connecting portion. Since the end portions protrude when they are inserted in the rotor or stator, from now on they will be referred to as a "free protruding portion" and "opposite connected protruding portion". The connected protruding portion may also be referred to as a "head portion".

Referring to FIG. 1(a), a hairpin 255 is preformed from a linear conductor (not shown) by bending it to form a first leg 255a with a related end 255aE of free protruding portion, and a second leg 255b with a related end 255bE of free protruding portion. The bending simultaneously forms a bridge-like connection 255c between the two legs 255a, 255b. The preformed hairpin in this example has the shape of a squashed "U". In order to manufacture a stator of electric machine, it is known for example to subject the "U"- or "P"-shaped preformed hairpins to two different types of twisting.

A stator or rotor core of a radial magnetic flow electric machine substantially is a ring having two flat faces and two cylindrical surfaces having generators perpendicular to the two flat faces and parallel to the rotation axis of the rotor of the electric machine. Unless otherwise specified, the radial, circumferential and axial directions mentioned later relate to the latter axis. One of the two cylindrical surfaces is at least partially adjacent to the gap of the electric machine, said stator or rotor of which is a part, and defines a group of slots in which the rectilinear parts of the winding are accommodated. The two flat surfaces are separate in surface or insertion side and surface or side opposite to the insertion side. The parts of the winding protruding outside said core are said heads. The ends of the free portions of the conductors belong to the head protruding from the side opposite to the insertion side, the conductors for the most part being subject to welding. If there are bridge-like protruding portions in the winding, they belong to the head protruding from the insertion side. Be they free or bridge-like connected, the portions protruding from the insertion side are indicated later as protruding portions insertion side.

The core area of stator or rotor between one slot and another adjacent one is referred to as a tooth. The number of teeth is equal to the number of slots. The connecting part of the core teeth is referred to as a yoke, which defines a portion of each slot and with respect thereto lies at the side opposite to the slot opening on the machine gap.

The slot may be divided into a matrix of positions; in each of these positions, a leg of a basic conductor may be placed. The conductors accommodated in the same radial position of the slots define a so-called winding layer.

In a first type of twisting, also referred to as a "twisting from the insertion side", the preformed basic conductors are conveniently inserted into specific radially aligned pockets or "slots" made in a twisting device which is adapted to deform such conductors after the insertion. The twisting device essentially "widens" the legs of the "U" or "P" shape to ensure the two legs of each conductor, after extracting the latter from the twisting device, may then be inserted into a corresponding pair of slots of a stator core which are angularly staggered from each other by a predetermined distance substantially equal to the angular distance between the slots in which the legs are successively inserted, and radially spaced apart by the radial distance between the slot positions occupied by the legs, respectively.

For example, but not exclusively as shown in FIG. 1(a), a hairpin is formed, from a preformed hairpin, in the shape suitable for the insertion thereof into the stator (or rotor) by widening the legs 255a, 255b and shaping the bridge-like connection 255c to obtain for example the shape in FIG. 1(b). 255p indicates the pitch of the hairpin, i.e. the linear distance or the angular distance or the distance in terms of slot pitches, between the legs. It is worth noting that here the middle top 255c2 of the formed hairpin is the area where the section of the conductor undergoes a 180° rotation with respect to the median surface of the hairpin (surface passing through the hairpin and including the two legs).

Patent Application published under number US 2009/0178270 discloses an example of a twisting method on the insertion side for the twisting with uniform pitch of the preformed bar conductors after the insertion thereof into the pockets of a twisting device, in which the hairpins have rectangular cross section.

According to the known art and in reference to FIG. 2, the hairpins may also be obtained by die-pressing, a process in which a rectilinear conductor is pressed against a stop element with a "punch and die" type system. FIG. 2(a) shows such a die-pressed conductor; it does not have a cross section which rotates with respect to the median surface of the hairpin.

This die-pressed hairpin, or also a preformed and widened hairpin, obtained as above, may be subjected to the so-called "twisting welding side", in which case the above rotation and a "step" shape of the protruding portions of the legs 255a and 255b may be introduced, where e.g. leg 255a has a first rectilinear portion 255a1, a step-shaped portion 255a2 and a second rectilinear portion 255a3 (substantially corresponding to portion 255aE in FIG. 1), as shown in FIG. 2(b).

Referring to FIG. 3, the shape of the protruding portion on the insertion side, i.e. of the bridge-like connection 255c, for a die-pressed hairpin may comprise three portions 255c1, 255c3 and 255c2 starting from the connection to the second leg 255b and ending at the connection to the first leg 255a (concealed in FIG. 3). Portion 255c1 has a main extension direction B and a radius of curvature $R_B$, portion 255c3 a main extension direction A and a radius of curvature $R_A$, portion 255c2 a main extension direction C (and possibly an own curvature, not shown). $\alpha_1$ indicates the angle between the directions A and C, $\alpha_2$ the angle between the directions A and B and $\alpha_3$ the angle between the directions B and C, equal to the sum of the angles $\alpha_1$ and $\alpha_2$. This is only one of the possible final shapes of a hairpin; any other shape with different portions and shaping, both of the bridge-like portion and of the legs, is usable with the apparatus and method according to the present description.

Again, conductors referred to as "I-pins" exist, a term meaning a conductor to be accommodated in a single slot and, when in the slot, having the portions with free ends protruding from both flat faces of the stator core. The ends of the I-pin may be welded to ends of other conductors protruding from the slots or other elements (e.g. bus bar, eyes) or may function as phase terminals. The portions may be subjected to "welding side" type bending. An example of an I-pin is in the conductors indicated with numerals 81 to 83 of document U.S. Pat. No. 7,622,843B2. "W-shaped conductors" are also known; refer again to U.S. Pat. No. 7,622,843 B2, for example. A W-shaped conductor may be shaped by welding a die-pressed hairpin with an I-pin, or with welding a fourth conductor with three I-pins.

Furthermore, and referring to FIG. 4, there is a stranded hairpin, with folding of the cross section in the bending part (FIG. 4(a)) or with continuous transposition along the portions of the hairpin accommodated in the slot (FIG. 4(b); U.S. Pat. No. 3,837,072). A variant not depicted may be a similar hairpin without folding.

All the above-described types of hairpins and also the I-pins and W-pins are included below in the term "basic conductors".

After being subjected to the first type of twisting or after being die-pressed, the basic conductors typically are preassembled in a winding set as indicated above. The preassembly apparatus has a series of slots in which the legs of each hairpin are inserted, and in general is different from the twisting device.

The winding set is then inserted en-bloc into the slots of the stator core through a first side thereof (so-called "insertion side" or "insertion face") with the respective free portions protruding from a second side of the core (so-called "welding side" or "connection side" or "welding face" or "exit face") opposite to the first side.

According to the specific winding layout to be obtained, the free portions of the basic conductors protruding from the welding side may therefore be subjected to a second type of twisting, also referred to as a "twisting welding side", for example after being inserted into pockets made in specific twisting equipment. The purpose of the twisting equipment here is to bend or twist the free portions of the conductors to conveniently shape such free portions and accordingly allow the appropriate electrical connections to be made between the conductors in order to complete the winding. Patent Application published under number US 2009/0302705 describes an example of a method of twisting welding side of the type indicated above.

The problem is felt of increasing the number of wires in the stator slot by compacting the volumes of the electric machine, thus increasing the number of layers in the stator slot while minimizing the slot air spaces and maximizing the ratio between volume of slot-inserted copper and volume available net of the volume occupied by the insulating materials.

To this end, it is worth noting that certain undesired deformations in the connecting portions prevent the increased compactness and assembly of the corresponding head of the winding and therefore, hinder an increased slot filling, especially when the winding has an increased number of conductors per slot. The undesired deformations of the connecting portions of a winding crown cause an undesired distance between the layers of the crown itself, i.e. the minimum radial distance between the inner and outer legs of the winding crown. Moreover, the undesired deformations of the connecting portions in windings with several winding crowns result in an undesired minimum distance between legs of adjacent layers of various winding crowns. This may also be due for example, to the deformation and the rotation of the section of the wire in certain bending points of the connecting portion and it has negative effects on the slot filling. In other words, as much as the head of the winding may be radially compacted, there is a greater distance between the rectilinear parts of the conductors accommodated in a slot than in the head due to the undesired deformations on the connecting portions.

The need is therefore felt for a device and a process which allow the ratio to be improved between volume of copper and available volume in a slot. To this end in particular, the need is felt to allow stator or rotor winding sets to be assembled with increased filling of the slot space, thus deforming the protruding portions insertion side of a winding with a tool which can be adjusted according to possible various mechanical properties of the wire.

SUMMARY OF THE INVENTION

It is an object of the present invention to provide a device for modeling hairpins which allows increased filling of the slot space in the assembly of stator or rotor winding sets.

It is a further specific object of the present invention a process which uses the device of the invention for modeling hairpins in order to obtain stators or rotors with an increased density of basic conductors.

It is subject-matter of the present invention a device or apparatus and/or a method according to the appended claims.

It is further subject-matter of the present invention a stator or a rotor of an electric machine, in which one or more winding sets of a bar winding are inserted, which are obtained by means of the method and/or the device of the invention, according to the appended claims of stator or rotor.

It is a still further subject-matter of the present invention further an electric machine which uses a stator and/or a rotor obtained by the invention, according to the appended claim of electric machine.

BRIEF DESCRIPTION OF THE DRAWINGS

The invention will now be described by way of non-limiting example, with particular reference to the accompanying drawings, in which.

DETAILED DESCRIPTION

It is specified here that the elements of different embodiments described later may be combined to provide further embodiments without limitations while respecting the technical concept of the invention, as those skilled in the art will easily understand from the description and the claims below.

The present description also refers to the known art for the implementation thereof, concerning detail features not described, such as for example less important elements usually used in the known art in solutions of the same type.

When an element is introduced, it always means that there may be "at least one" or "one or more", unless otherwise specifically indicated.

When a list of elements or features is listed in this description, it means that the invention according to the present description "comprises" or alternatively "consists of" such elements.

Equal or similar elements may be indicated with the same numerals in the accompanying drawings.

For the purposes of the present description, the terms "radial" or "circumferential" or other similar expressions defined with respect to a direction or axis, refer to a circumference lying on a plane orthogonal to such a direction or axis and which has the middle on said direction or axis. Moreover, for the purposes of the present description, the term "angularly spaced" (or other similar expressions) defined with respect to a direction or axis, refers to the angle between two radii of a circumference lying on a plane orthogonal to such a direction or axis and which has the middle on said direction or axis.

The present description relates to a device (or apparatus or assembly) and a method for modeling hairpins (advantageously made of copper, having circular or non-circular cross section) prior to the preassembly thereof in a stator or rotor bar winding set. Reference is indifferently made below to "hairpin" to mean "hairpin conductor" or "basic conductor". "Basic conductor" means including a hairpin with widened legs (with legs not bent over the welding side), as described below, or an I-pin or a W-pin.

Figure 5:
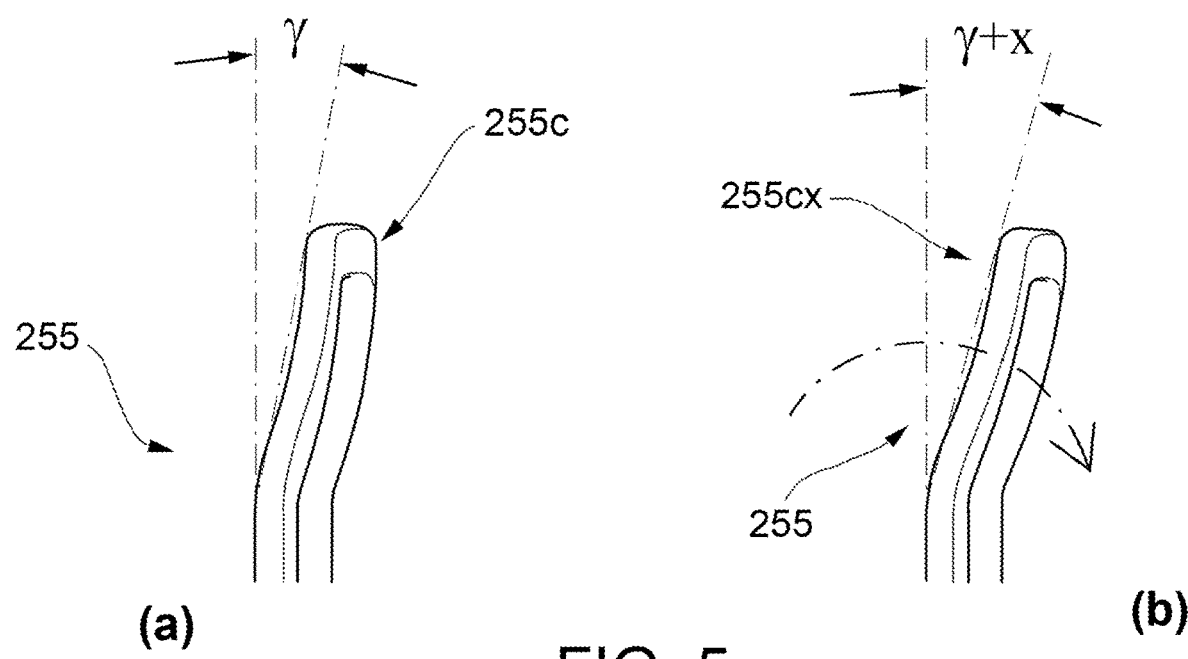
FIG. 5 shows in (a) the angular movement of the portion of hairpin on the insertion side in the case of preassembled hairpin according to the prior art, and in (b) as individually modeled according to the present description.
Figure 7:
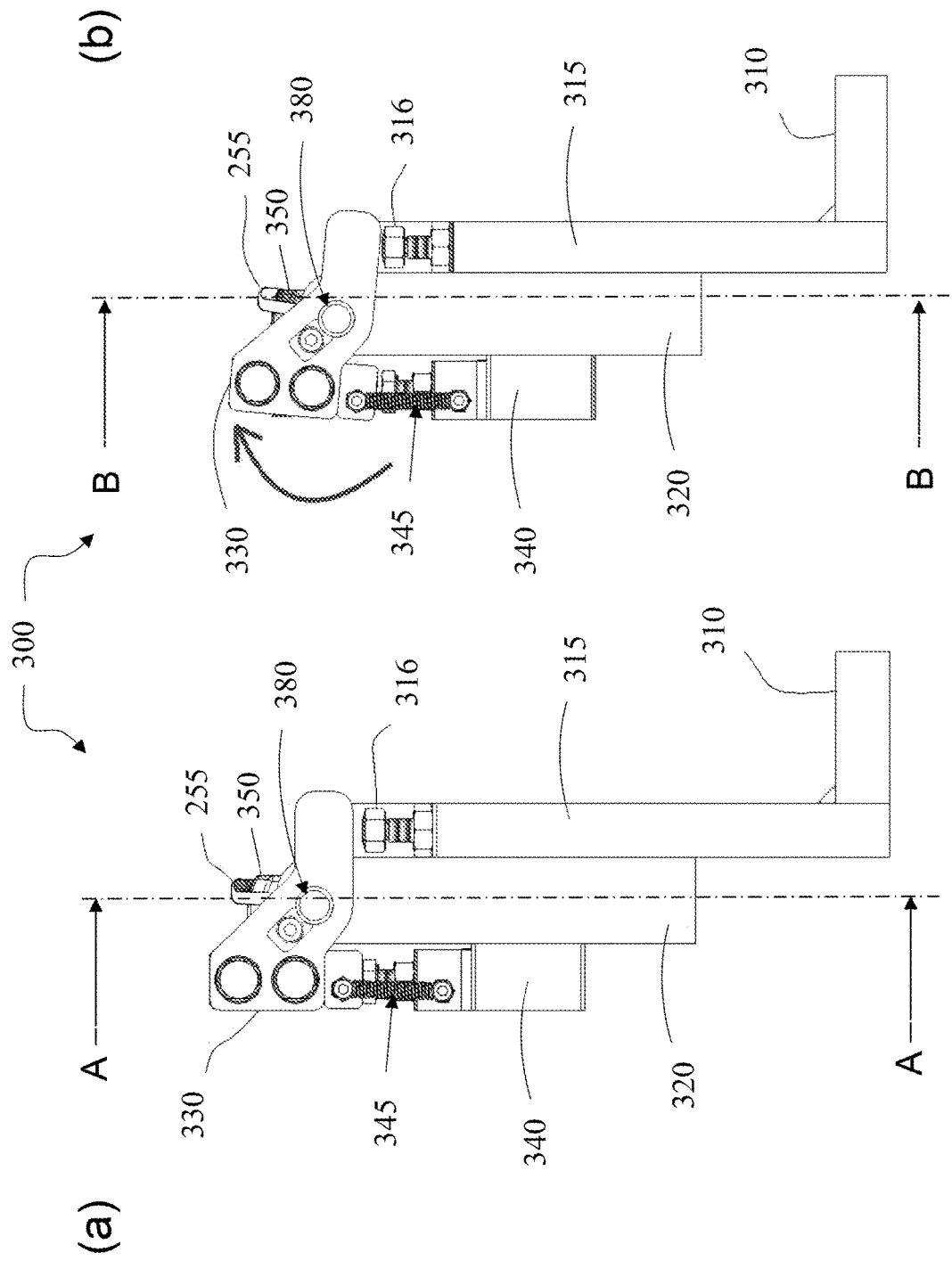
FIG. 7 shows two statuses of a modeling device according to one embodiment of the present description: in (a) an initial resting status in which the starting hairpin is inserted as in FIG. 5(a), and in (b) a final modeled status in which the hairpin is modeled as in FIG. 5(b)
Figure 8:
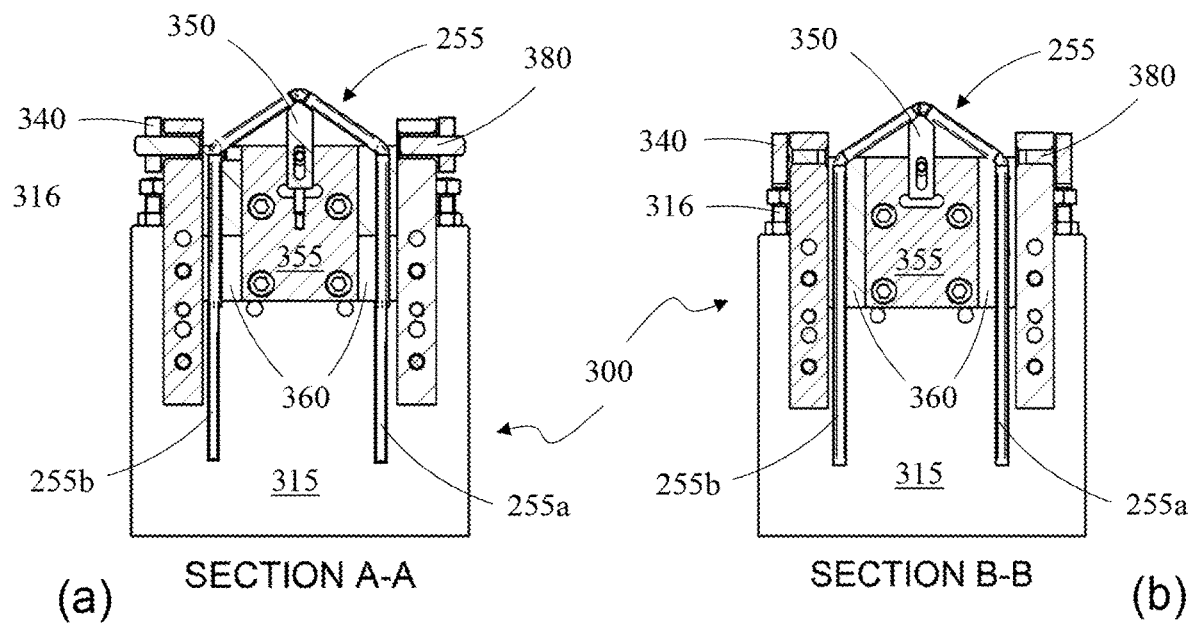
FIG. 8 shows, in (a) and (b), two sections of the device in FIG. 7 in directions A-A in (a) and B-B in (b), respectively.

Referring to FIG. 5, the solution according to the present description involves modeling a single hairpin prior to the preassembly thereof in a winding set. As depicted in FIG. 5(a), a conventional hairpin 255 comprises an insertion side portion 255c which is inclined by an angle γ with respect to a predefined plane, for example passing through the two (or more) legs 255a and 255b thereof. Such a plane may pass through at least three points, for example two points of one leg and one point of the other leg, and the angle γ may be calculated with respect to a plane passing through the ends of the bridge-like connecting portion 255c or generically through the ends of a protruding portion insertion side (for clarity, those connecting to the legs) and through at least one point of the bridge-like connection itself. Once the reference planes of the two portions of the hairpin are defined, the measurement of the angle discussed in the solution of the present description, may be calibrated. There may be different definitions of angle of the head portion with respect to the legs; they all may be functional in the present invention since the invention allows such an inclination to be varied once defined. Obviously the most appropriate definition is selected so as to obtain the desired variation, i.e. the final basic conductor obtained is that desired.

It is worth noting that "head portion" here means, in the case of an I-pin, one of the free ends which is not accommodated in the seats or slots of a frame or of a stator/rotor when such a head portion is to be bent with respect to the rest of the accommodated leg.

The solution of the present description indeed intends increasing this inclination by a further angle x (positive or negative), for example in the same rotation direction. This may be done individually on each hairpin prior to the assembly thereof in a winding set.

When "individually" is used here, it also means that several hairpins may be deformed simultaneously or within the framework of the same deforming action according to the present description, provided that they never interfere in the deformation so as to keep the surface glaze thereof.

Figure 1:
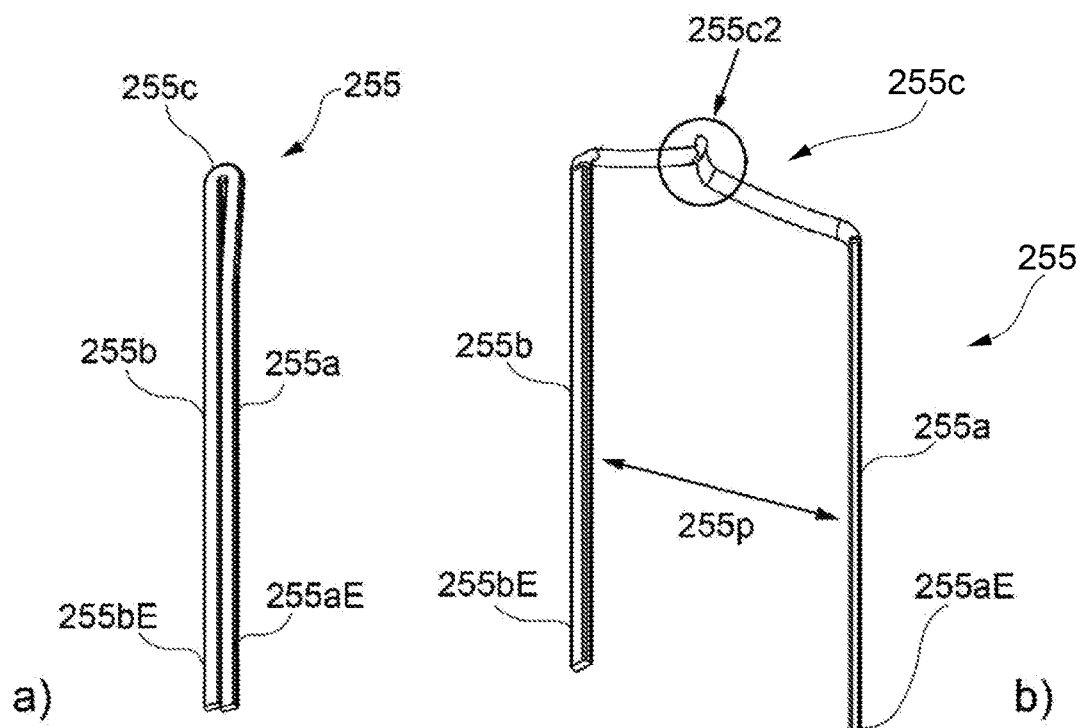
FIG. 1 shows in (a), a preformed squashed U-shaped hairpin, and in (b) a hairpin formed according to the known art.
Figure 2:
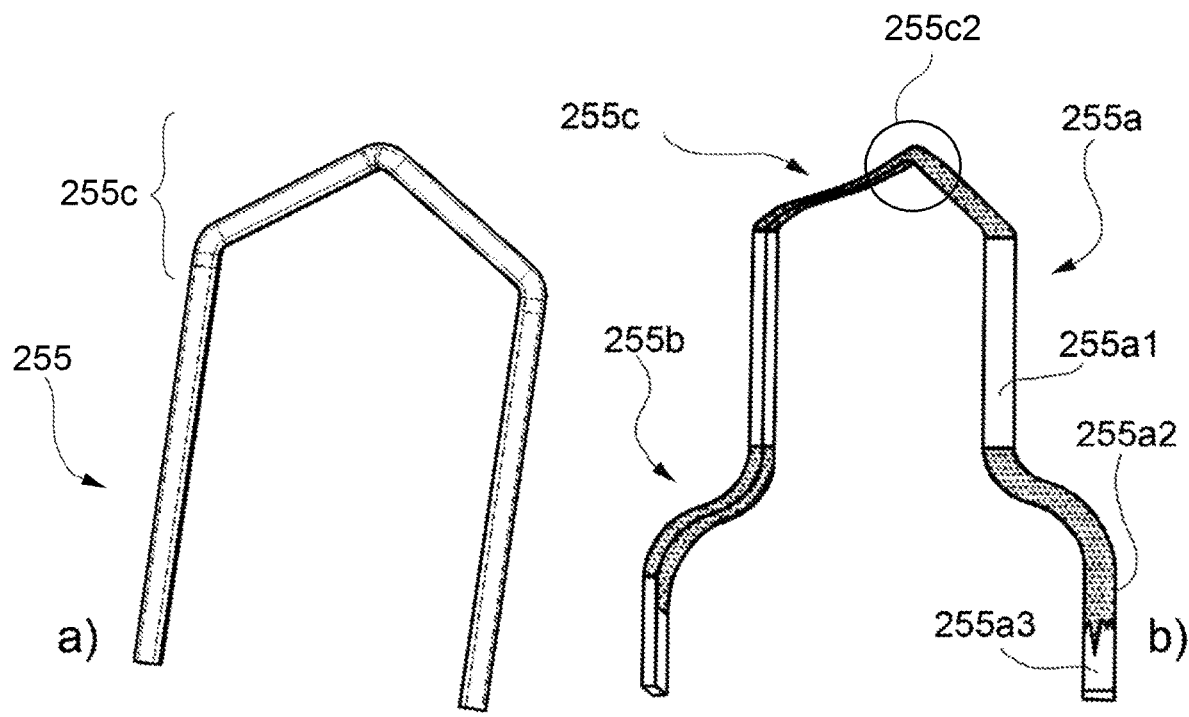
FIG. 2 shows in (a) a die-pressed conductor, and in (b) a conductor after being subjected to twisting on the welding side.
Figure 3:
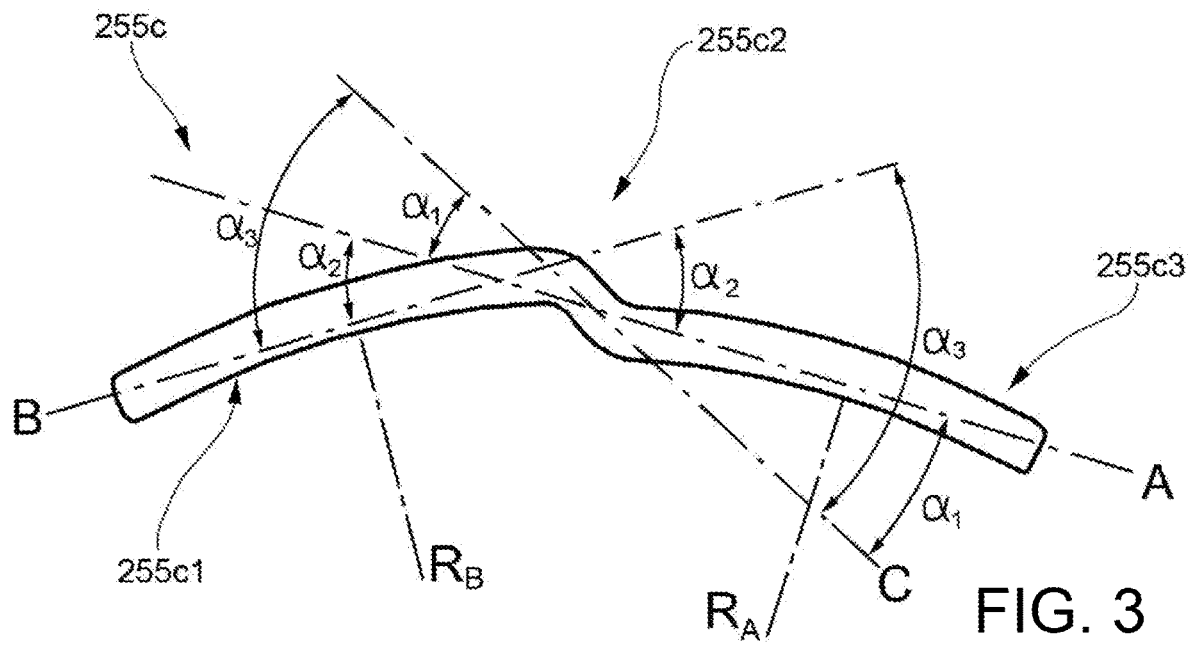
FIG. 3 shows the hairpin in FIG. 1(b) or 2(a) from the top, according to the known art.
Figure 4:
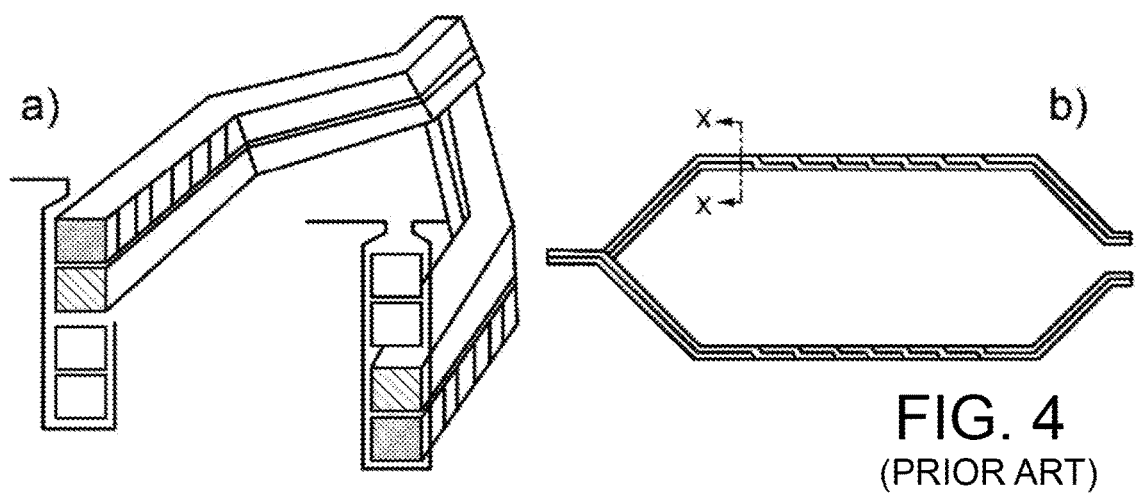
FIG. 4 shows in (a) a stranded hairpin, with folding of the cross section in the bending part, and in (b) with continuous transposition along the portions of the hairpin accommodated in a slot.
Figure 6:
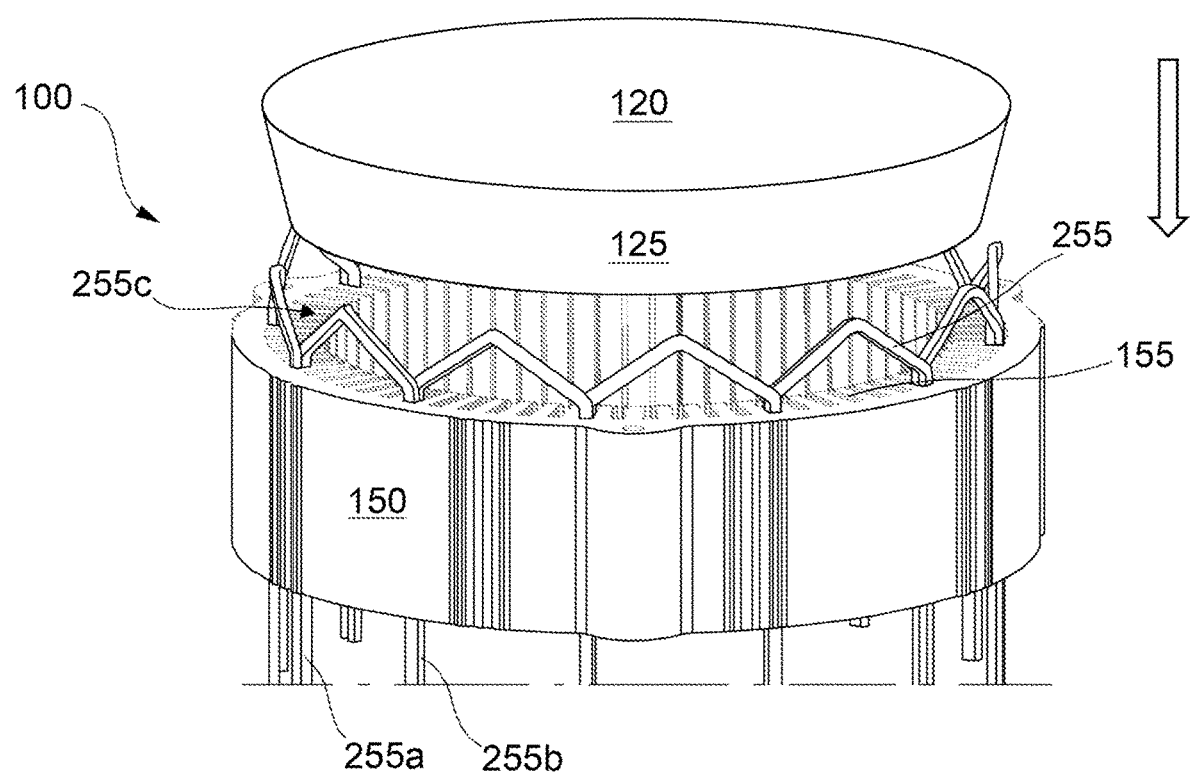
FIG. 6 shows a hairpin modeling device according to one embodiment of the present description, which allows the hairpins to be simultaneously widened using a spreader wedge.

Referring to FIG. 6, according to one embodiment of the present description, a device for modeling hairpins in the meaning described above may consist of a frame 150 with slots 155 in which the hairpins 255 are inserted. A wedge 120 is lowered into the crown of slots 155 so as to push the bridge-like portion 255c of the hairpins. The frame in this and the other embodiments may be, by way of non-limiting example, a stator/rotor or an assembly system of the basic conductors of a bar winding. The frame may also be a different device from the stator or rotor, and therefore the bent basic conductors may be taken from the frame and placed in various manner in the stator or rotor, for example using an assembly device of winding sets beforehand. The wedge, or the deformation element in general, be it a wedge or other, is to be movable with respect to the housing portions. The term "mounted in movable manner" means that there is a constraint between wedge and frame (not shown in the drawing) such that the wedge may move within this constraint. In particular, the movement is possible from the top downwards.

If the hairpins are inserted in the slots 155 to form a complete winding set and then the wedge is operated as above, the bridge-like portions of close hairpins in the winding set undergo a mutual friction which may damage the coating of the hairpins themselves.

To resolve this secondary problem, according to the invention, the hairpins are to be arranged in the slots so that the bridge-like portions 255c thereof do not interfere during the entire modeling process to avoid the friction between the hairpins. The basic conductors may be inserted so that said head portions are at a predetermined radial or angular distance from one another, in particular the basic conductors are arranged in said one or more corresponding respective housing portions so that successive basic conductors in angular direction have one leg radially overlapping the leg of the successive one, without contact between the respective head portions (as in FIG. 6). Therefore, there are various methods for configuring the slots in the frame and the hairpins in the slots so that this is possible, only one example of which is illustrated.

As an alternative to the wedge, a plurality of elements may be used which act on the connecting portion of the conductors, deforming it, which are arranged radially and are movable in radial direction with respect to the same axis as the stator/rotor or of the assembly device. In general, this is an integral element which is sized and shaped so as to interfere with the hairpins in a single movement.

For the purposes of the method according to the present description, different assembly devices may be used from the wedge system 100 and possibly the use of manual means such as grippers or the like, taking care to position the hairpins so that they do not interfere with one another, contrary to the positioning of the hairpins in the winding sets for the purposes of the known art. The method according to this aspect of the present description allows:
1. minimizing the air spaces in a slot,
2. assembling winding sets with increased slot filling,
3. having an axial compacting (secondary problem),
4. avoiding the friction (secondary problem), only if the assembly system/stator is conveniently partially populated.

Referring to FIGS. 7-10, they show an embodiment of a modeling device according to the present description. Although such a description illustrates the modeling of a single hairpin, it is understood that the elements and the means useful for such a modeling may be repeated and arranged in the same device, possibly with respective integrated components, so as to model several hairpins in likewise and parallel manner, which are then used in the various applications in which they serve.

The device comprises a group of frame elements 310, 315, 320, 340 to which a deformation (or modeling, in the example implemented by means of thrust) element 330 (or means) is rotatably connected, for example due to a pin 380. The deformation element 330 is optionally and advantageously restored in position by a spring 345, or other element or means which exerts a restoring force, connected between the deformation element 330 itself and the group of frame elements indicated above.

According to one aspect of the present description, the group of frame elements comprises a base 310, a vertical element 315 connected to base 310, a supporting element 320 of pin 380, an anchoring element 340 of spring 345. Advantageously, the elements 315, 320 and 340 are in contact with one another along parallel planes.

According to one aspect of the present description, the supporting element 320 comprises two parallel brackets possibly joined to each other at one end or at a given height. There are two pins 380 at a respective end of the supporting element 320, the pins sharing the same axis and on which the deformation element 330 is mounted so that it may rotate about said axis. A group 350, 360 for housing hairpin 255 so that the connecting part thereof protrudes with respect to said axis is arranged between the two parallel brackets. Advantageously, element 350 is a support element of the vertex 255c2 of hairpin 255 and the slots element 360 (also consisting of two parallel brackets fastened to the supporting element 320 and/or to the vertical element 315) contains two (or more) slots for inserting the legs of the hairpin. A further element 355 which is integral with element 350 is conveniently arranged between the slots element 360 and element 350. According to one aspect of the invention, the position of the support element 350 is adjustable along an axis perpendicular to the axis of pin 380 to allow different hairpins to be modeled.

A pushing or contact element 370 is mounted between the housing group 350, 360 (for example, fastened to/integral with said thrust element 330 and sliding over said slots element 360 through protruding elements 375) and the deformation element 330 so that upon rotation of the deformation element 330, the pushing element 370 pushes the protruding portion on the insertion side of hairpin 255 in the same direction in a sufficiently uniform manner, thus carrying out an angular movement x with respect to the plane of the slots of the slots element 360.

Figure 9:
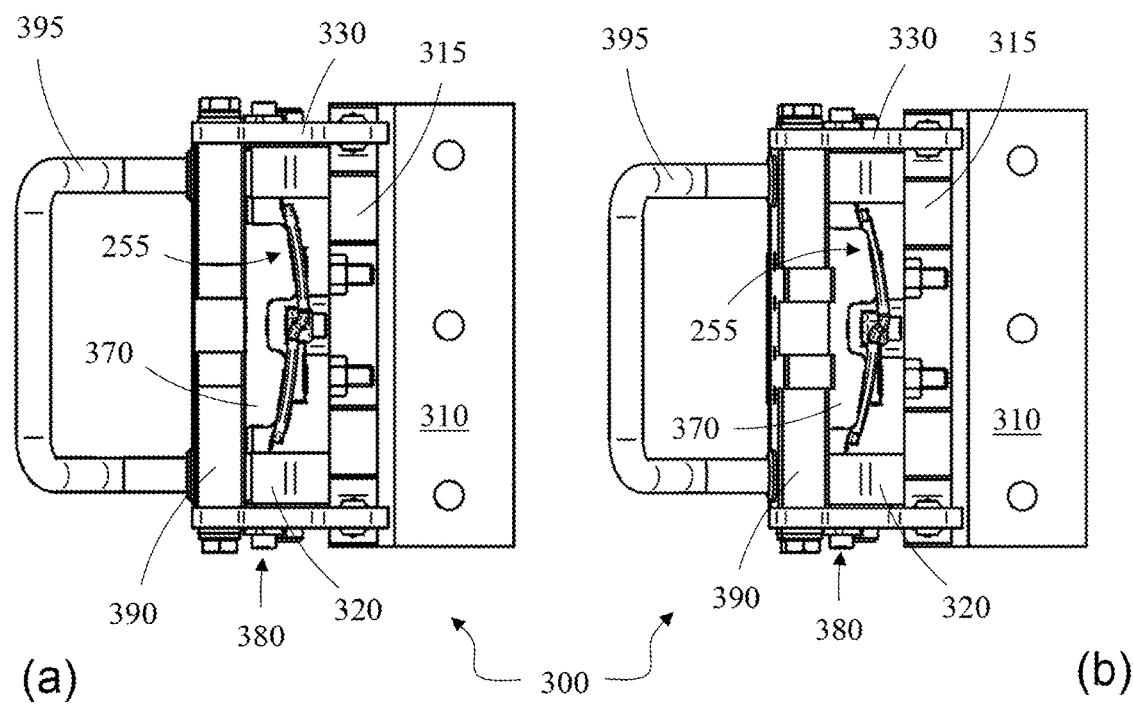
FIG. 9 shows, in (a) and (b), a top view of the device in FIG. 7 in the two corresponding operating statuses in FIG. 7.
Figure 10:
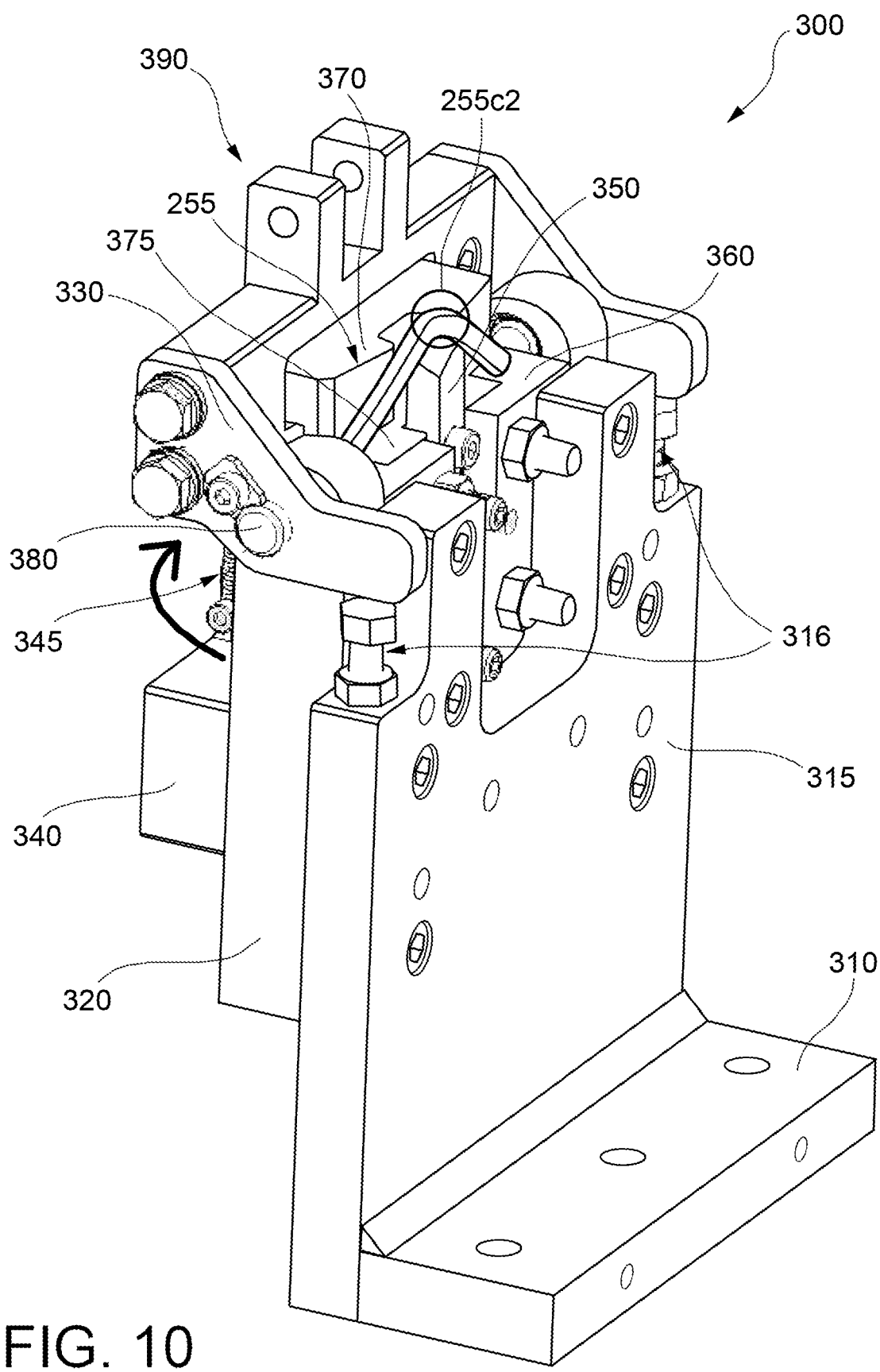
FIG. 10 shows a perspective view of the device in FIGS. 7 to 9, in the initial resting position.

The deformation element 330 may have anchoring supports 390 for a handle or piston which pushes it. Referring to FIG. 9, handle 395 is fastened in 390, even though it is not shown in the other drawings for simplicity of depiction. There may be a mechanical actuator which rotates the deformation element 330 instead of or in addition to handle 395.

Optionally according to the present description, the modeling (or "folding" or "deformation") device has means 316 for adjusting the bending angle x, for example in the form of one or more calibrating screws.

In general, the following is a process for modeling one or more basic conductors 255 according to the present description.

Firstly, a device is to be provided, which comprises:
a frame 310, 315, 320, 340;
one or more corresponding partial or total housing portions 350, 360 for housing said one or more basic conductors 255, each housing portion being integrally connected to or formed in said frame 310, 315, 320, 340; and
one or more corresponding deformation elements 330 of said one or more basic conductors 255.

The one or more corresponding deformation elements 330 are configured and adapted to move from an initial position, in which they substantially do not apply any action on said one or more basic conductors 255, to a final deformation position of said one or more basic conductors 255, in which said angle takes a value γ+x different from said predetermined value γ. Moreover, said one or more corresponding housing portions 350, 360 are configured so that said one or more basic conductors 255 may be inserted without mutual interference of the respective bridge-like portions 255c, and remain non-interfering, both in said initial position and in all the statuses up to said final position.

At this point, the legs of said one or more basic conductors are inserted into said one or more corresponding housing portions 350, 360 so that the bridge-like connecting portions 255c thereof do not interfere with one another, both in said initial position and in all the statuses up to said final position.

Finally, said at least one deformation element 330 is moved from said initial position to said final position. The movement preferably is such that the head portions 255c and/or the legs 255a, 255b of the basic conductors are not in mutual contact in all the statuses up to said final position. The movement preferably is a rotation movement with respect to at least one of said one or more corresponding housing portions 350, 360, or with respect to an arbitrary axis, preferably perpendicular to both legs or parallel to a plane which passes through at least three points of the legs of the basic conductor. Such a rotation provides the additional effect of avoiding or reducing the friction of the thrust means with respect to the basic conductors, and therefore of causing less damage to the coating of the basic conductor.

Hairpins which may form a winding set are obtained with the method according to the present description. One or more winding sets may thus be mounted on a stator or a rotor. In particular, one or more winding sets 290 may be mounted with a reciprocally different angle x. These winding sets may be inserted one after the other, so that said angle x decreases from a first winding set closest to the yoke of the stator/rotor to a last winding set closest to the gap of the stator/rotor. In greater detail, given that the crowns are deformed, an insertion order is to be followed: the first crown to be inserted is that with the greatest angle x and the last one, with the smallest angle x.

Although the case of bending the connecting protruding portion with respect to the plane of the legs of the hairpin has been illustrated, the case is entirely possible and included in the present description in which said connecting part remains stationary and the legs are bent by an angle x in the direction opposite to the case illustrated. Indeed, in order to obtain the sought-after effects, it is the mutual bending between the connecting part (insertion side) and plane of the legs which matters and not if, practically, one of the two is kept stationary.

Moreover, although the case of a device for modeling a hairpin with two legs has been described, the same technical concept may easily be implemented for a W-pin with three legs, or also for an I-pin with one leg alone. Obviously in this latter case, the pushing element is to be adapted to grip a single protruding portion insertion side (for W, I or U conductor) which is no longer a bridge-like connecting portion, rather a simple rod or eye portion.

Figure 18A:
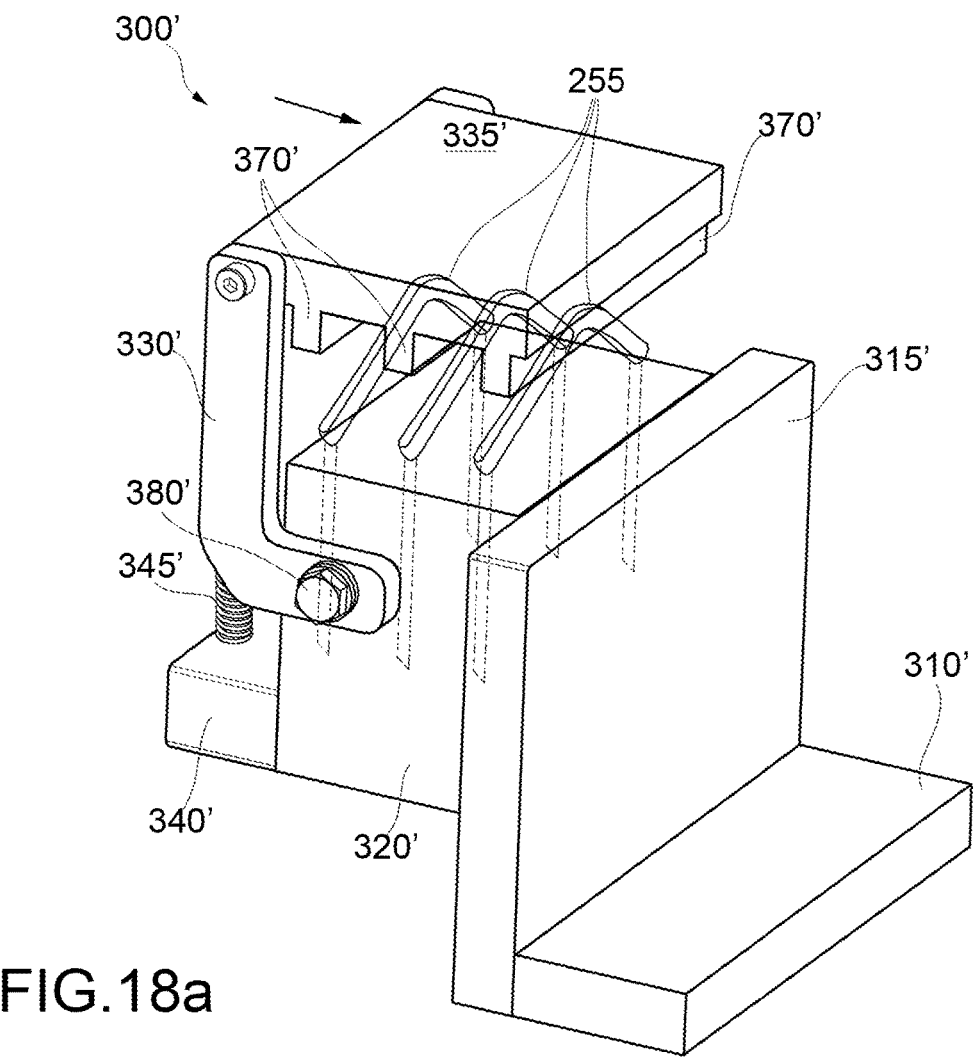
FIG. 18 shows in (a), a diagrammatic example of multiple deformation means which are applicable in deforming several basic conductors by deformation process, and in (b) the case of application of such multiple deformation means to obtain a staggered deformation over time.
Figure 18B:
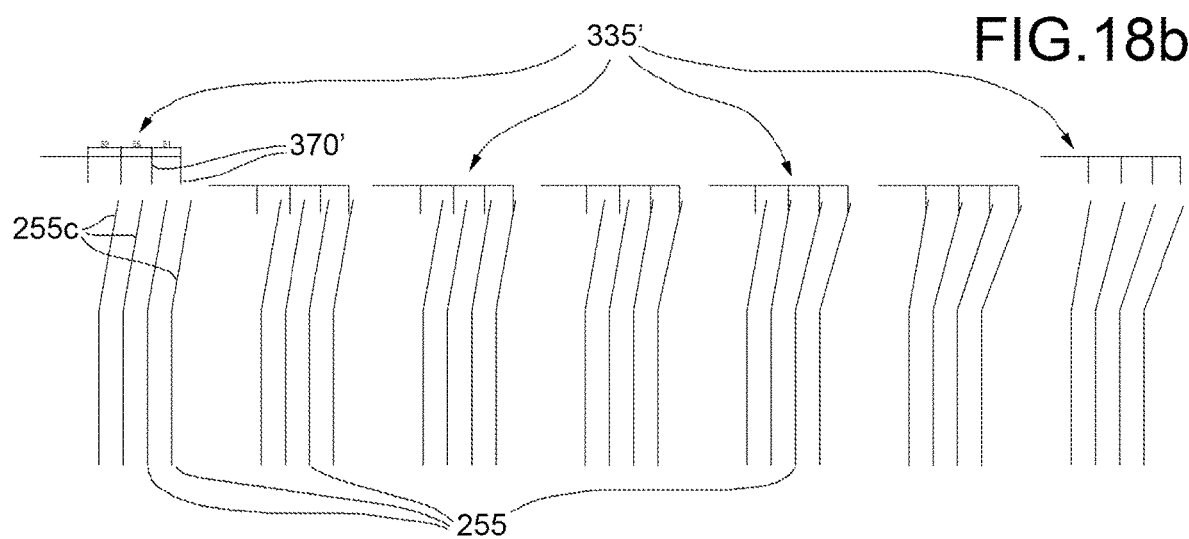

Referring to FIG. 18, an example of multiple deformation means is illustrated. Indeed, according to the invention, several hairpins may be deformed at one time by the deformation means. Device 300' shows the multiple version of that in FIG. 10. By analogy with FIG. 10, numeral 310' indicates a base of the multiple frame, 315' the vertical element of the multiple frame, 320' the supporting element of pin 380', 330' the thrust or traction multiple element, 340' the element for anchoring the restoring spring 345', 380' the pin which allows the rotation of element 330'/335', and finally 370' the preferably rigid pushing or contact elements. The distance between such pushing elements is fixed, but it is not necessarily to be the same between the various elements. An equal distance allows a simultaneous bending of the basic conductors 255 without them interfering (avoiding that they touch one another during the deforming); a different distance between each pair of pushing elements 370' allows a slightly staggered bending over time. The rotation about pin 380' is not essential, element 375' may also be moved horizontally by moving means (not shown). The fixed distance may also be implemented for the other embodiments illustrated.

Figure 11:
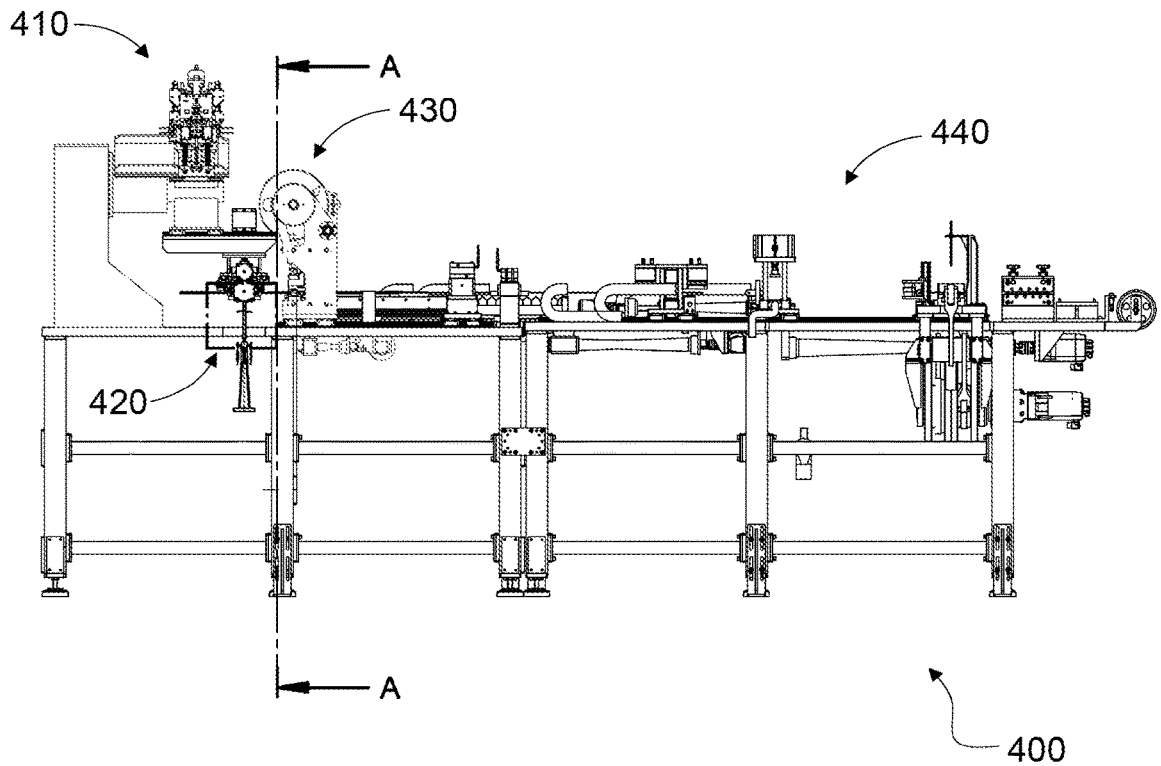
FIG. 11 shows a production line of modeled hairpins, in which the device of the present description is inserted.

Referring to FIG. 11, the device according to the present description may be mounted in a production line 400 for manufacturing individual hairpins and also in a winding set assembly-preassembly system. According to one aspect of the present description, the production line 400 may comprise a section for unwinding the conductor wire 440 from a coil, a so-called cutting section 430 which cuts the linear conductor to the desired length, a bending section 420 which includes a first device which forms the hairpin according to the known art, and a second in-line device which imparts the further rotation angle x of the connecting part, according to the present description. As an alternative to the manufacturing section of the conductor wire, there may be a die-pressing section 410 which connects to the bending section 420 if the hairpin is die-pressed.

Figure 12:
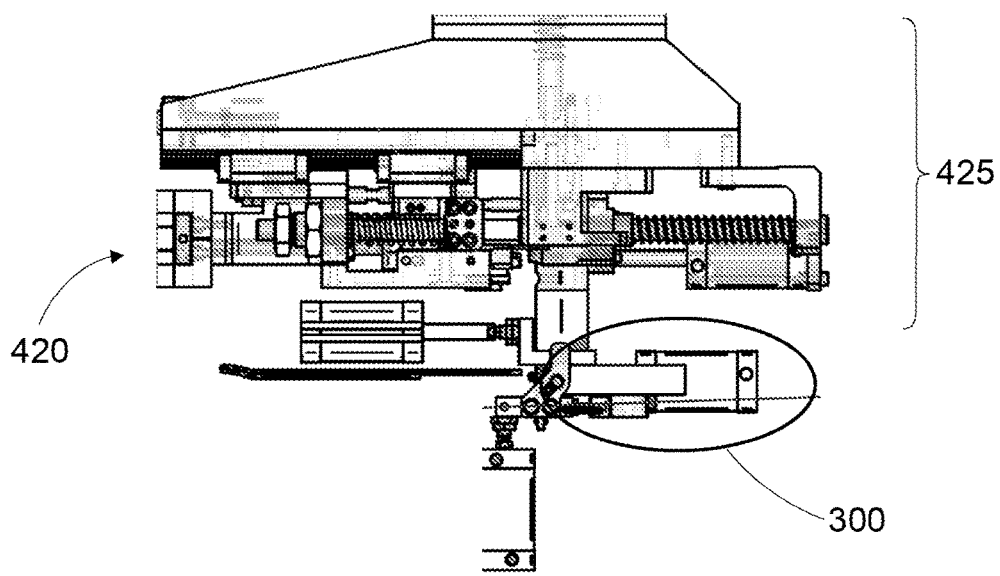
FIG. 12 shows the detail of the position of the device of the present description in FIG. 11.

FIG. 12 shows the modeling device 300 according to the present description, at the outlet of the bending device 425 of the hairpin as in the prior art.

Referring now to FIGS. 13 to 17, they show in greater detail, a difference in effect of the solution according to the present description with respect to the methods for obtaining windings of the type described defined by the prior art.

Figure 13:
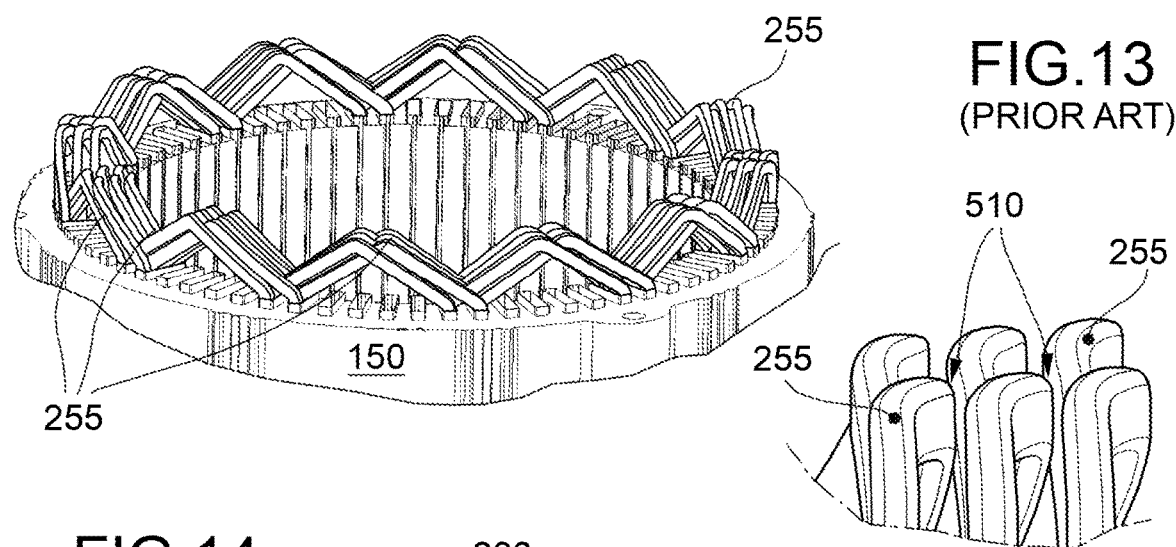
FIG. 13 shows the arrangement of hairpins insertion side during the formation of a winding set, according to the known art.

FIG. 13 shows a winding set having part of the hairpins which form it concealed for reasons of clarity of illustration, in an assembly device or stator/rotor 150, with an enlarged detail which highlights contact area 510 between the hairpins 255.

Figure 14:
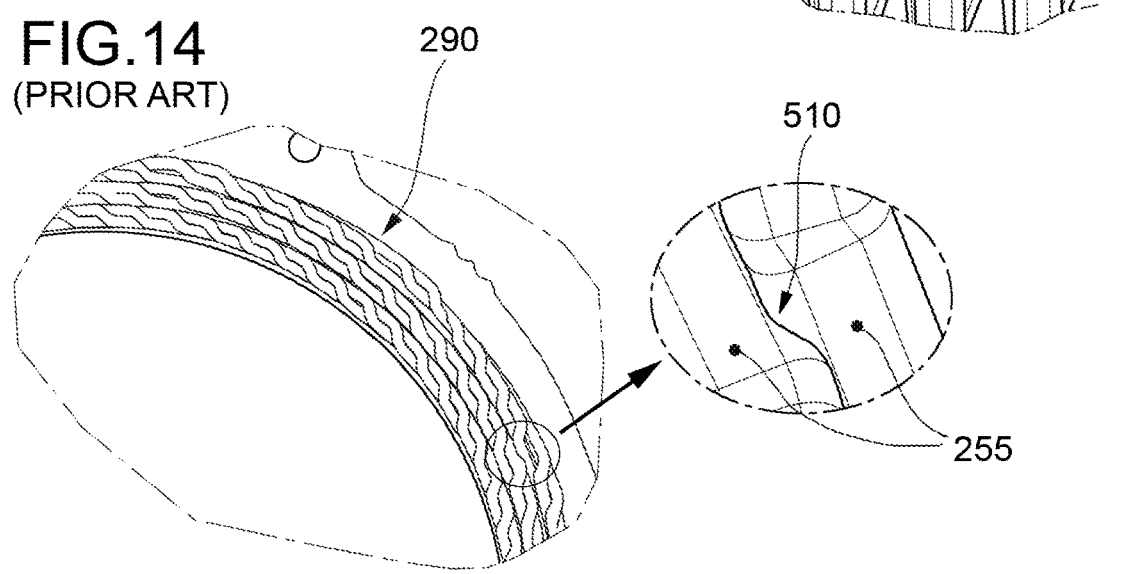
FIG. 14 shows the interference which may occur between adjacent connecting parts belonging to various crowns, which can be avoided using the method of the present invention.

FIG. 14 shows a winding set 290 formed from the arrangement in FIG. 13, in which there are three concentric crowns. The same type of interference 510 between hairpins of different crowns is apparent.

Figure 15:
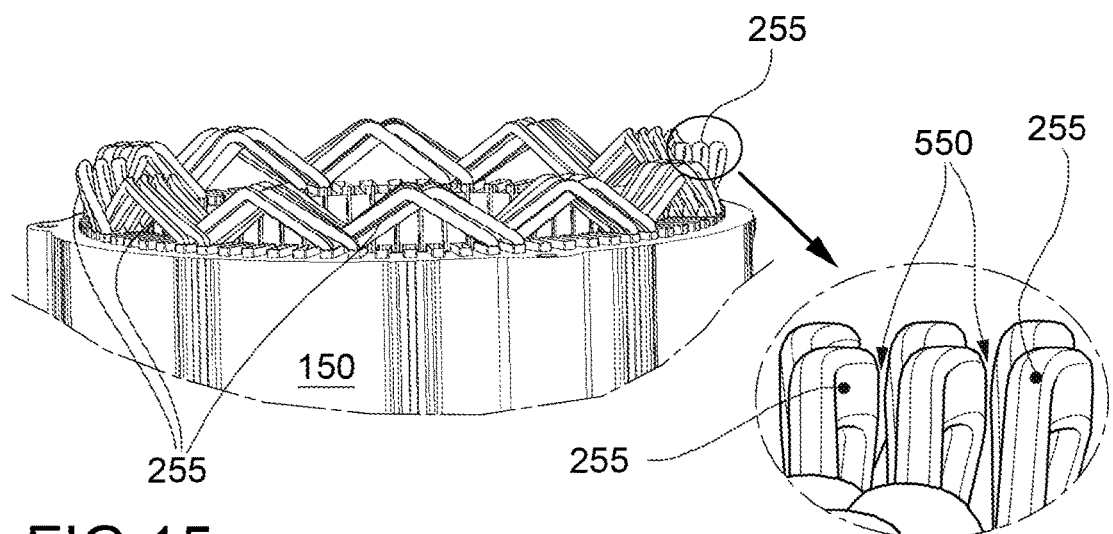
FIG. 15 shows a part of the basic conductors of a winding obtained according to the method of the present invention, having different entity for each crown, the other part being concealed to facilitate viewing the bend of the connecting parts; in detail, it is worth noting the benefit of the present method in the distance between the connecting portions of various crowns, which is mainly useful for slot filling.

FIG. 15 shows a winding set according to the present description in an assembly device or stator/rotor 150 with certain hairpins hidden, with an enlarged detail which highlights empty areas 550 between the hairpins 255, unlike the two preceding drawings of the known art.

Figure 16:
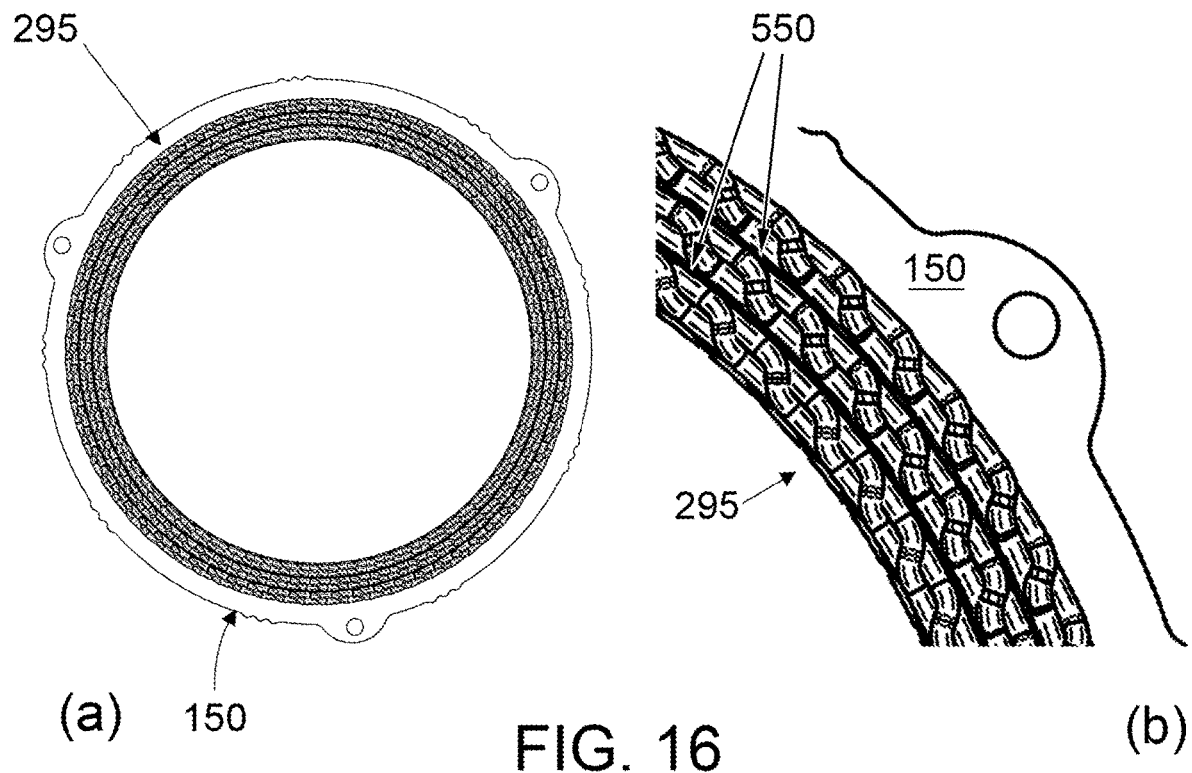
FIG. 16 shows in (a), a multi-crown winding set obtained insertion side according to the present description, and in (b) the detail of the spaces between the crowns.

This effect is also shown in FIG. 16 in a top view of the three-crown winding set 295 obtained according to the solution of the present invention, in which there is clearly a space 550 between the hairpins of the different crowns. With this space, which is obtained by a modeling that introduces an additional rotation angle of the protruding portion on the insertion side of hairpin with respect to the plane of the legs thereof, the winding set may be mounted without damaging the surface of the hairpins, and in particular the coating thereof, due to the friction forces.

Figure 17:
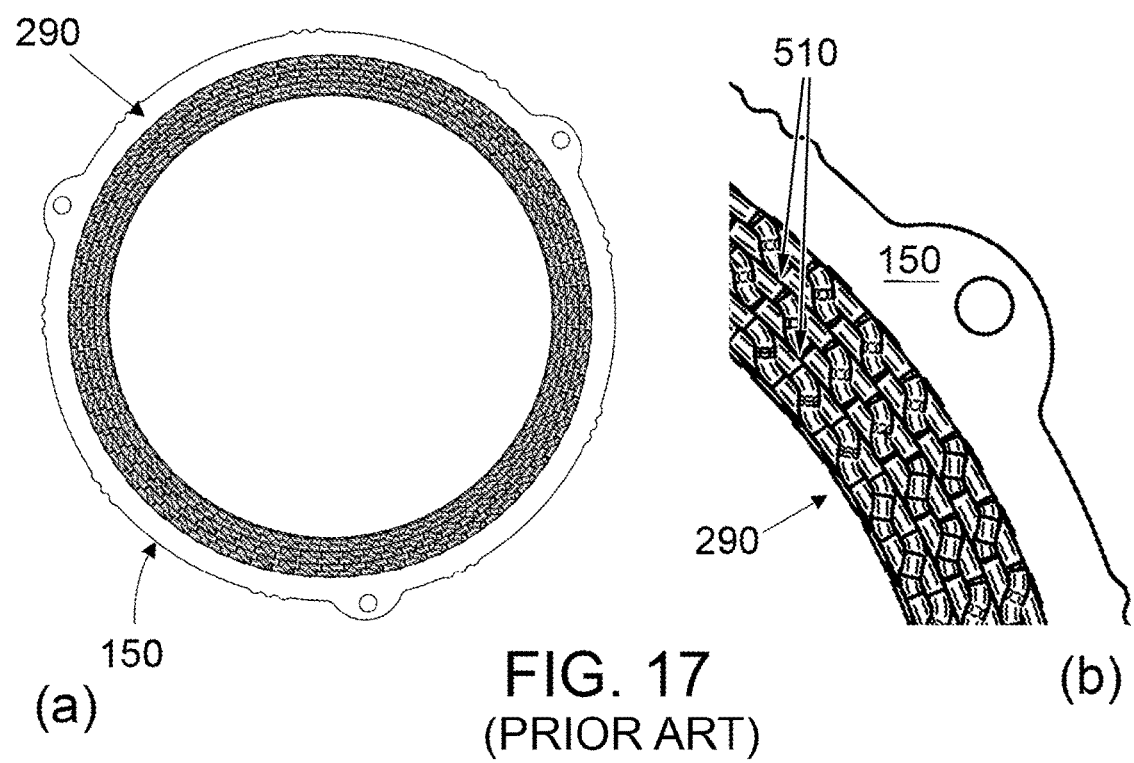
FIG. 17 shows in (a), a multi-crown winding set obtained on the insertion side according to the known art, and in (b) the detail of the spaces between the crowns.

In contrast, FIG. 17 shows a traditional winding set 290 in which there are no spaces between the hairpins 255 of the different crowns, and rather the hairpins are in contact 510, thus creating frictions which damage the coating thereof.

At this point, the modeled hairpin may be extracted which, after a minimum elastic return, has the upper part at a different angular position from the starting position (FIG. 5).

In traditional solutions, the insertion of the areas in the stator without the above-described forming does not allow minimizing the air spaces in a slot. Indeed, without implementing a bend in radial direction of the connecting part with respect to the plane of the legs, the increase of the space between crowns—which is required to maintain the isolation thereof during the operation of the machine—is associated with an equal increase of the space between the legs in a slot and therefore, with a non-optimal exploitation of the slot space.

Instead, with the modeling of the hairpin obtained due to the device according to the present description, stators are obtained with an improved exploitation of the slot spaces, by occupying the space available for the presence of the stator or rotor yoke. Moreover, as secondary effect, the interference between wires of concentric winding sets is avoided.

According to the solution of the present description, among other things, this is obtained by imparting an additional bend between the connecting part and the legs of the hairpin, for each individual hairpin, prior to the preassembly thereof in a winding set.

As mentioned above, the circular crown enclosing the legs of a winding crown having adjacent layers in general may be thinner, in a top view like those in FIGS. 16 and 17, than that which encloses the connecting parts of said legs. This is due to the deformation and rotation of the section of the wire in certain bending points. This increase, summed with the minimum spacing between the crowns required for the operation of the machine, is reflected on the slot filling.

These two aspects instead do not occur if a further bending of the connecting portion, of different entity for each crown, is carried out in the radial direction, as in the case of the present description. Thereby, the distance between the crowns required for the insertion is not reflected on the slot. The bending direction depends on the possibility of occupying the space close to the machine gap or close to the stator yoke. Generally, the bending is outwards if the core yoke is more external than the crown of the slot matrix. Contrarily, the bending is inwards.

The method and the device claimed perform the bending of the connecting part of a basic conductor, minimizing the mechanical stresses on the isolating coating of the conductor in order to promote the insertion of a crown in a stator/rotor whose winding consists of several crowns.

The method and the device claimed perform the bending of the connecting part of a basic conductor by an adjustable quantity. Such an adjustment may be performed according to the mechanical properties of the wires which may differ due to the different elastic return due to the geometry thereof, the metal processing of copper, the coating material. This in turn allows the travel of the deformation element to be adjusted in an easier manner as compared to designing and manufacturing a new die.

The preferred embodiments were described above, and variants of the present invention were suggested, but those skilled in the art may make modifications and changes without departing from the related scope of protection, as defined by the appended claims.

LIST OF REFERENCES IN THE DRAWINGS

100=deformation system according to an embodiment of the present description
120=spreader wedge
125=side of the spreader wedge consisting of pushing element of the (contact portion with the) basic conductors
150=deformation frame (stator/rotor or assembly system) with incorporated housings for the hairpins
155=slot for partially or totally inserting hairpin legs
255=hairpin
255a=first leg of the hairpin
255aE=free end of the first leg of the hairpin
255a1=a first rectilinear portion of the leg of the hairpin
255a2=a step-shaped portion of the leg of the hairpin
255a3=a second rectilinear portion of the leg of the hairpin
255b=second leg of the hairpin
255bE=free end of the second leg of the hairpin
255c=bridge-like connection of the legs of the spread, die-pressed or formed hairpin
255c1=portion of the bridge-like connection connected to the second leg
B=main extension direction of the portion 255c1
$R_B$=radius of curvature of the portion 255c1
255c3=portion of the bridge-like connection connected to the first leg
A=main extension direction of the portion 255c3
$R_A$=radius of curvature of the portion 255c3
255c2=middle portion of the bridge-like connection
C=main extension direction of the portion 255c2
$\alpha_1$=angle between the directions A and C
$\alpha_2$=angle between the directions A and B
$\alpha_3$=angle between the directions B and C, equal to the sum of $\alpha_1$ and $\alpha_2$
255p=distance between the legs of the hairpin (pitch)
γ=rotation angle of the portion 255c with respect to a plane passing through the two legs of the hairpin 255
x=further rotation angle of the portion 255c with respect to a plane passing through the two legs of the hairpin 255, for example in the same direction as the angle γ
255cx=portion of the protruding hairpin on the insertion side rotated by x with respect to the position of 255c
290=traditional winding set (winding set)
295=winding set according to the present description
300=deformation device or apparatus 300'=multiple deformation device or apparatus
310=frame base
310'=multiple frame base
315=vertical element
315=vertical element of multiple frame
316=adjustment means of the bending angle x
320=pin supporting element 380
320'=pin supporting element 380'
330=thrust or traction element
330'=multiple thrust or traction element
340=spring anchoring element 345
340'=spring anchoring element 345'
345=restoring spring
345'=restoring spring
350=support element of vertex 255c2 of the hairpin
355=element integral with element 350
360=slots element
380=pin
380'=pin
370=pushing or contact element, preferably rigid
370'=pushing or contact element, preferably rigid
375=protruding element
380=pin
390=anchoring support
395=handle
400=hairpin production line
410=die-pressing section
420=bending section
425=device for bending the hairpin according to the prior art
430=cutting section
440=unwinding section of the conductor wire
510=contact area between the hairpins 255, in a traditional winding set 290
550=empty area between the hairpins 255, in a winding set 295 according to the present description

The invention claimed is:

1. A device for modeling one or more die-pressed hairpins prior to assembly thereof in a winding set, wherein each die-pressed hairpin has an insulating coating and comprises two or more legs having corresponding pitches such that they are insertable into a stator or rotor core, and a bridge-like head portion, said two or more legs including respective one or more free ends opposite to said bridge-like head portion, wherein an angle between a first plane passing through at least three points of said two or more legs and a second plane passing through ends of the bridge-like head portion and through at least one point of the bridge-like head portion takes a predetermined value ($\gamma$), the device comprising:
one frame which includes one or more respective housing portions configured to partially house said one or more die-pressed hairpins having said corresponding pitches, each housing portion being integrally connected to or formed in said one frame; and
one or more respective deformation elements for deformation of said one or more die-pressed hairpins;
wherein:
said one or more respective housing portions are configured so that when said one or more die-pressed hairpins are a plurality of die-pressed hairpins, they are housable so as to be spaced apart from one another; and
when said one or more respective deformation elements are a plurality of deformation elements, they are mounted at a fixed distance from one another;
wherein:
each deformation element of said one or more respective deformation elements of said one or more die-pressed hairpins is rotationally mounted with respect to at least one of said one or more respective housing portions so as to rotate with respect to a pre-defined axis parallel to said first or second plane;
said one or more respective deformation elements are integral with one another and respective pushing elements are mounted on said one or more respective deformation elements, the respective pushing elements being configured and adapted to push either said bridge-like head portion or said two or more legs; and
said one or more respective deformation elements are configured and adapted to move from an initial position, in which they do not apply any action on said one or more die-pressed hairpins, to a final deformation position of said one or more die-pressed hairpins, wherein said angle takes a value ($\gamma$+x) different from said predetermined value ($\gamma$).

2. The device of claim 1, wherein at least one deformation element of said one or more respective deformation elements applies a thrust, and between said at least one deformation element and said one frame, restoring means are mounted which apply a restoring force of said at least one deformation element towards said initial position.

3. The device of claim 2, wherein said restoring means comprise a spring.

4. The device of claim 1, wherein at least one deformation element of said one or more respective deformation elements is configured to be moved by a manual actuator or by a motorized actuator.

5. The device of claim 1, wherein said at least one housing portion of said one or more respective housing portions is configured and adapted to accommodate said two or more legs only.

6. A method for modeling one or more die-pressed hairpins prior to assembly thereof in a winding set, wherein each die-pressed hairpin has an insulating coating and comprises two or more legs having corresponding pitches such that they are insertable into a stator or rotor core, and a bridge-like head portion, said two or more legs including respective one or more free ends opposite to said bridge-like head portion, wherein an angle between a first plane passing through at least three points of said two or more legs and a second plane passing through ends of the bridge-like head portion and through at least one point of the bridge-like head portion takes a predetermined value ($\gamma$), the method comprising the following steps:
S1. providing a device for modeling one or more die-pressed hairpins prior to assembly thereof in a winding set, the device comprising:
one frame which includes one or more respective housing portions configured to partially house said one or more die-pressed hairpins having said corresponding pitches, each housing portion being integrally connected to or formed in said one frame; and
one or more respective deformation elements for deformation of said one or more die-pressed hairpins;
wherein:
said one or more respective housing portions are configured so that when said one or more die-pressed hairpins are a plurality of die-pressed hairpins, they are housable so as to be spaced apart from one another; and
when said one or more respective deformation elements are a plurality of deformation elements, they are mounted at a fixed distance from one another;
wherein:

each deformation element of said one or more respective deformation elements of said one or more die-pressed hairpins is rotationally mounted with respect to at least one of said one or more respective housing portions so as to rotate with respect to a pre-defined axis parallel to said first or second plane;

said one or more respective deformation elements are integral with one another and respective pushing elements are mounted on said one or more respective deformation elements, the respective pushing elements being configured and adapted to push either said bridge-like head portion or said two or more legs; and said one or more respective deformation elements are configured and adapted to move from an initial position, in which they do not apply any action on said one or more die-pressed hairpins, to a final deformation position of said one or more die-pressed hairpins, wherein said angle takes a value ($\gamma+x$) different from said predetermined value ($\gamma$);

S2. inserting the two or more legs of said one or more die-pressed hairpins into said one or more respective housing portions, so that, when a plurality of die-pressed hairpins is used, the bridge-like head portion and the two or more legs of any one of said one or more die-pressed hairpins are not in contact with a respective bridge-like head portion and legs of any other of said one or more die-pressed hairpins in said initial position; and S3. moving said one or more deformation elements from said initial position to said final deformation position so that the bridge-like head portion and the two or more legs of any one of said one or more die-pressed hairpins are not in contact with the bridge-like head portion and legs of any other of said one or more die-pressed hairpins, in all states up to the final deformation position.

7. The method of claim 6, wherein, when a device for modeling one or more die-pressed hairpins prior to assembly thereof in a winding set, wherein each die-pressed hairpin has an insulating coating and comprises two or more legs having corresponding pitches such that they are insertable into a stator or rotor core, and a bridge-like head portion, said two or more legs including respective one or more free ends opposite to said bridge-like head portion, wherein an angle between a first plane passing through at least three points of said two or more legs and a second plane passing through ends of the bridge-like head portion and through at least one point of the bridge-like head portion takes a predetermined value ($\gamma$), the device comprising:

one circular frame which includes one or more respective housing portions configured to partially house said one or more die-pressed hairpins having said corresponding pitches, each housing portion being integrally connected to or formed in said one circular frame; and a circular spreader wedge having a pushing tapered side configured to push and deform said one or more die-pressed hairpins;

wherein:

said one or more respective housing portions are configured so that when said one or more die-pressed hairpins are a plurality of die-pressed hairpins, they are housable so as to be at a predetermined angular distance from one another along the one circular frame and spaced apart from one another;

said circular spreader wedge is configured and adapted to move downwardly from an initial position above the one circular frame, in which the pushing tapered side does not apply any action on said one or more die-pressed hairpins, to a final deformation position of said one or more die-pressed hairpins, wherein said angle takes a value ($\gamma+x$) different from said predetermined value ($\gamma$) is provided in step S1, said one or more die-pressed hairpins in said step S2 are inserted so that said head portions are at a predetermined angular distance from one another along the one circular frame.

8. The method of claim 6, wherein the two or more legs of said die-pressed hairpins are arranged in said one or more respective housing portions so that successive die-pressed hairpins in angular direction have one leg radially overlapping the leg of the successive one, without contact between respective bridge-like head portions.

9. An apparatus for manufacturing die-pressed hairpins prior to assembly thereof in a winding set, the apparatus comprising a section for unwinding a bar conductor having an insulating coating from a coil, a section for cutting the bar conductor to a desired length, a bending section for bending the bar conductor, wherein the bending section includes at least one device according claim 1.

\* \* \* \* \*